United States Patent
Shi et al.

(10) Patent No.: US 11,820,213 B2
(45) Date of Patent: Nov. 21, 2023

(54) FOLDABLE SUPPORT STRUCTURE FOR SOFT HIGH TOP OF PICKUP TRUCK

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

( * ) Notice: Subject to any disclaimer, the term of this patent is extended or adjusted under 35 U.S.C. 154(b) by 0 days.

(21) Appl. No.: 17/838,313

(22) Filed: Jun. 13, 2022

(65) Prior Publication Data
US 2023/0294494 A1 Sep. 21, 2023

(30) Foreign Application Priority Data
Mar. 15, 2022 (CN) .......................... 202220573383.1

(51) Int. Cl.
*B60J 7/10* (2006.01)
(52) U.S. Cl.
CPC .................................... *B60J 7/104* (2013.01)
(58) Field of Classification Search
USPC ........................................ 296/100.06, 100.08
See application file for complete search history.

(56) References Cited

U.S. PATENT DOCUMENTS

| | | | | |
|---|---|---|---|---|
| 5,322,336 A | * | 6/1994 | Isler | B60J 7/1621 296/100.1 |
| 5,584,521 A | * | 12/1996 | Hathaway | B60J 7/104 296/36 |
| 5,988,728 A | * | 11/1999 | Lund | B60J 7/1621 296/100.03 |
| 6,234,559 B1 | * | 5/2001 | Block | B60J 7/1621 296/100.06 |
| 6,616,210 B1 | * | 9/2003 | Massey | B60J 7/1621 296/100.1 |
| 2017/0210430 A1 | | 7/2017 | Erlandson | |

* cited by examiner

*Primary Examiner* — Joseph D. Pape
(74) *Attorney, Agent, or Firm* — Bayramoglu Law Offices LLC (57) ABSTRACT

A foldable support structure for a soft high top of a pickup truck includes an installation base frame, a support frame, and a folding support rod. The installation base frame is fixedly connected with or integrally formed with a vehicle body. The support frame is hinged with the installation base frame. The folding support rod includes one end hinged with the support frame, and the other end fixedly connected with the installation base frame. The support frame of the foldable support structure for a soft high top of a pickup truck can be folded by the folding support rod, which occupies a small space.

6 Claims, 6 Drawing Sheets

ABLE SUPPORT STRUCTURE FOR
SOFT HIGH TOP OF PICKUP TRUCK

CROSS REFERENCE TO THE RELATED APPLICATIONS

This application is based upon and claims priority to Chinese Patent Application No. 202220573383.1, filed on Mar. 15, 2022, the entire contents of which are incorporated herein by reference.

TECHNICAL FIELD

The present invention relates to the technical field of auto parts, and in particular, to a foldable support structure for a soft high top of a pickup truck.

BACKGROUND

At present, most of the car roofs on the market are hard-top structures made of sheet metal and are foldable in a multi-section manner to achieve the convertible effect. However, the hard-top structure is relatively thick and heavy and the soft-top structure is relatively light. For the soft-top structure, a support structure is generally needed to support the soft top. For example, the Chinese patent No. 201210405688.2 discloses a detachable convertible soft top structure and a vehicle provided with the structure. When a first link mechanism and a second link mechanism move in opposite directions, the soft-top tarpaulin is opened, such that the entire soft-top structure is opened. When the first link mechanism and the second link mechanism move toward each other and stop at the rear cross beam of the vehicle, the soft-top tarpaulin is retracted accordingly, such that the soft top structure is closed, but the second link mechanism needs to bypass the entire space above the carriage and then is retracted, which occupies a lot of space.

SUMMARY

In order to solve the problem of large space occupied by the soft top support in the prior art, the present invention provides a foldable support structure for a soft high top of a pickup truck which reduces the occupied space.

The following technical solutions are used to solve the technical problems in the present invention.

A foldable support structure for a soft high top of a pickup truck includes:

an installation base frame, where the installation base frame is fixedly connected with or integrally formed with a vehicle body;

a support frame, where the support frame is hinged with the installation base frame; and a folding support rod, where the folding support rod includes one end hinged with the support frame, and the other end fixedly connected with the installation base frame.

Further, a first base and a second base may be arranged on the installation base frame. Positions of the first base and the second base on the installation base frame may be adjustable. The support frame may be hinged on the first base. The folding support rod may be detachably fixed on the second base.

Further, the folding support rod may include a first support rod and a second support rod. The first support rod may be rotatably connected with the second support rod. A first limiting structure configured to limit the first support rod and the second support rod in an unfolded state may be arranged between the first support rod and the second support rod.

Further, the first limiting structure may include a pull-ring indexing pin. A shell of the pull-ring indexing pin may be fixedly connected with a second support rod. A first support rod may be provided with a limiting hole used for penetration of a pin shaft of the pull-ring indexing pin.

Further, a screw may be arranged between the first support rod and the second support rod. The first support rod may be provided with a threaded hole matched with the screw. The second support rod may be provided with a through hole. The through hole may have a diameter greater than or equal to an outer diameter of a stud of the screw. The screw may pass through the through hole and is in threaded connection with the threaded hole.

Further, a second limiting structure configured to limit relative rotation directions of the first support rod and the second support rod may be further arranged between the first support rod and the second support rod.

Further, the second limiting structure may include a step arranged on the first support rod. An end of the second support rod may be in surface contact with the step, and the end of the second support rod may include one side being a right angle and the other side being a round chamfer. In this way, the first support rod and the second support rod can only be folded in the same direction to prevent interference with the support frame during folding.

Further, the folding support rod and the second base may both be provided with through holes. The two through holes may correspond to each other in position. A bolt may penetrate the through holes. A head of the bolt may be matched with a nut. An end of the folding support rod may be provided with a clamping groove. The clamping groove may be clamped on the bolt. The bolt may be matched with a butterfly nut configured to press and fix the folding support rod and the second base.

The Present Invention has the Following Beneficial Effects (1) The support frame of the foldable support structure for a soft high top of a pickup truck of the present invention can be folded by the folding support rod, which occupies a small space.
(2) One end of the folding support rod can be quickly disassembled, which is convenient for transportation and replacement of the folding support rod. After one end of the folding support rod is disassembled, the support frame can be completely attached to the installation base frame, which can also save space.
(3) The position and height of the support frame can be adjusted by changing the positions of the folding support rod, the first base, and the second base, such that the tightness of the soft top can be adjusted, which is convenient.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and those of ordinary skill in the art may still derive other drawings from these accompanying drawings without creative efforts.

REFERENCE NUMERALS 1, installation base frame, 11, first base, 12, second base, 2, support frame, 3, folding support rod, 31, first support rod, 311, step, 32, second support rod, 321, round chamfer, 4, pull-ring indexing pin, 41, shell, 42, pin shaft, 5, screw, 6, bolt, 7, nut, and 8, butterfly nut.

DETAILED DESCRIPTION OF THE EMBODIMENTS

The technical solutions in embodiments of the present invention will be described below clearly and completely with reference to the accompanying drawings in the embodiments of the present invention. Apparently, the described embodiments are merely a part, rather than all of the embodiments of the present invention. The following description of at least one exemplary embodiment is merely illustrative, and not intended to limit the present invention and application or use thereof in any way. All other embodiments obtained by those of ordinary skill in the art based on the embodiments of the present invention without creative efforts shall fall within the protection scope of the present invention.

It should be noted that the terms used herein are merely used for describing specific implementations, but are not intended to limit the exemplary implementations of the present invention. As used herein, the singular forms are intended to include the plural forms as well, unless the context clearly indicates otherwise, and also, it should be understood that when the terms "include" and/or "comprise" are used in this specification, they indicate that there are features, steps, operations, devices, elements, and/or combinations thereof.

The relative arrangement of the components and steps, the numerical expressions and numerical values set forth in these embodiments do not limit the scope of the present invention unless specifically stated otherwise. Meanwhile, it should be understood that for the convenience of description, the dimensions of various parts shown in the accompanying drawings are not drawn in an actual proportional relationship. The technologies, methods, and equipment known to those skilled in the art may not be discussed in detail, but where appropriate, the technologies, methods, and equipment should be regarded as part of the authorized specification. In all examples shown and discussed herein, any specific value should be interpreted as merely exemplary, rather than restrictive. Therefore, other examples of the exemplary embodiments may have different values. It should be noted that similar reference signs and letters represent similar items in the accompanying drawings below. Therefore, once an item is defined in one drawing, it does not need to be further discussed in subsequent drawings.

It should be understood that in the description of the present invention, orientation terms such as "front", "rear", "upper", "lower", "left", "right", "transverse", "longitudinal", "vertical", "horizontal", "top" and "bottom" indicate orientation or position relationships based on the accompanying drawings. Unless otherwise specified, these orientation terms are merely intended to facilitate or simplify the description of the present invention, rather than to indicate or imply that the mentioned device or elements must have a specific orientation and must be constructed and operated in a specific orientation. Therefore, they should not be construed as a limitation to the protection scope of the present invention. The orientation terms "inner" and "outer" refer to the inner and outer parts relative to the contour of the mentioned component.

For ease of description, spatially relative terms, such as "on the upper side of", "above", "on the upper surface of" and "on", can be used herein to describe the spatial positional relationship between devices or features shown in the figure. It should be understood that the spatially relative terms are intended to encompass different orientations of the devices in use or operation in addition to those shown in the figure. For example, if a device in the figure is inverted, it is described as a device "above other devices or structures" or "on the upper side of other devices or structures". Therefore, the device will be positioned as "below other devices or structures" or "on the lower side of other devices or structures". Therefore, the exemplary term "above" may include both orientations "above" and "below". The device may also be positioned in other different ways (rotated by 90 degrees or in other orientations), but the spatially relative description should be explained accordingly.

In addition, it should be noted that the use of words such as "first" and "second" to define parts and components is only for the convenience of distinguishing corresponding parts and components. Unless otherwise stated, the above words have no special meaning, so they should not be construed as a limitation on the protection scope of the present invention.

As shown in FIG. 1 to FIG. 7, a foldable support structure for a soft high top of a pickup truck of the present invention is provided, including: an installation base frame 1 fixedly connected with or integrally formed with a vehicle body. A support frame 2 is hinged with the installation base frame 1. A folding support rod 3 is arranged between the support frame 2 and the installation base frame 1. The folding support rod 3 includes one end hinged with the support frame 2, and the other end fixedly connected with the installation base frame 1.

A first base 11 and a second base 12 are arranged on the installation base frame 1. Positions of the first base 11 and the second base 12 on the installation base frame 1 are adjustable. The support frame 2 is hinged on the first base 11. The folding support rod 3 is detachably fixed on the second base 12. The first base 11 and the second base 12 can slide on the installation base frame 1 and can be positioned by screws.

Figure 5:
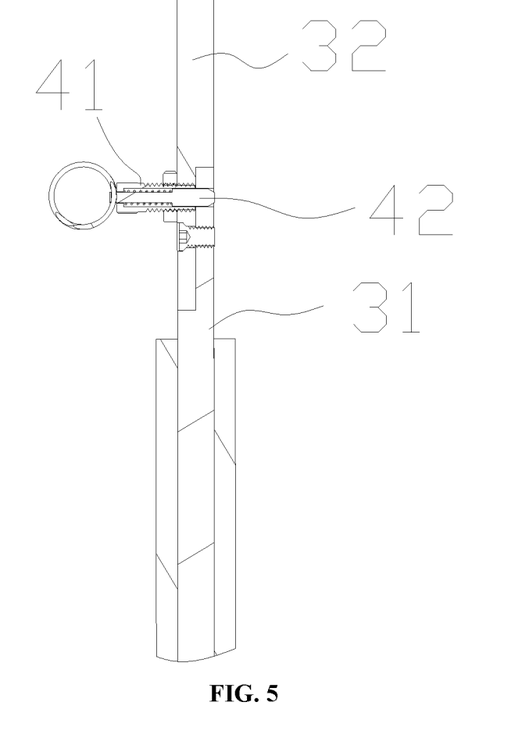
FIG. 5 is a sectional view of a connection relationship between a first support rod and a second support rod.
Figure 6:
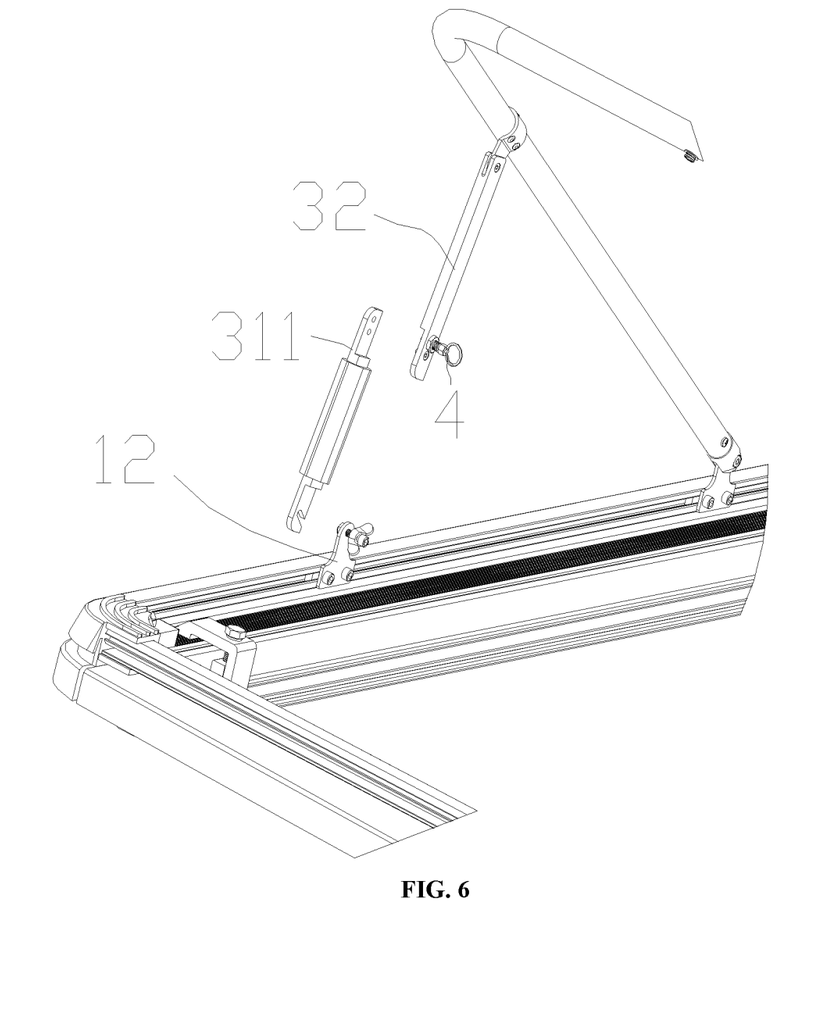
FIG. 6 is a disassembled state view of the first support rod of the foldable support structure for a soft high top of a pickup truck of the present invention.
Figure 7:
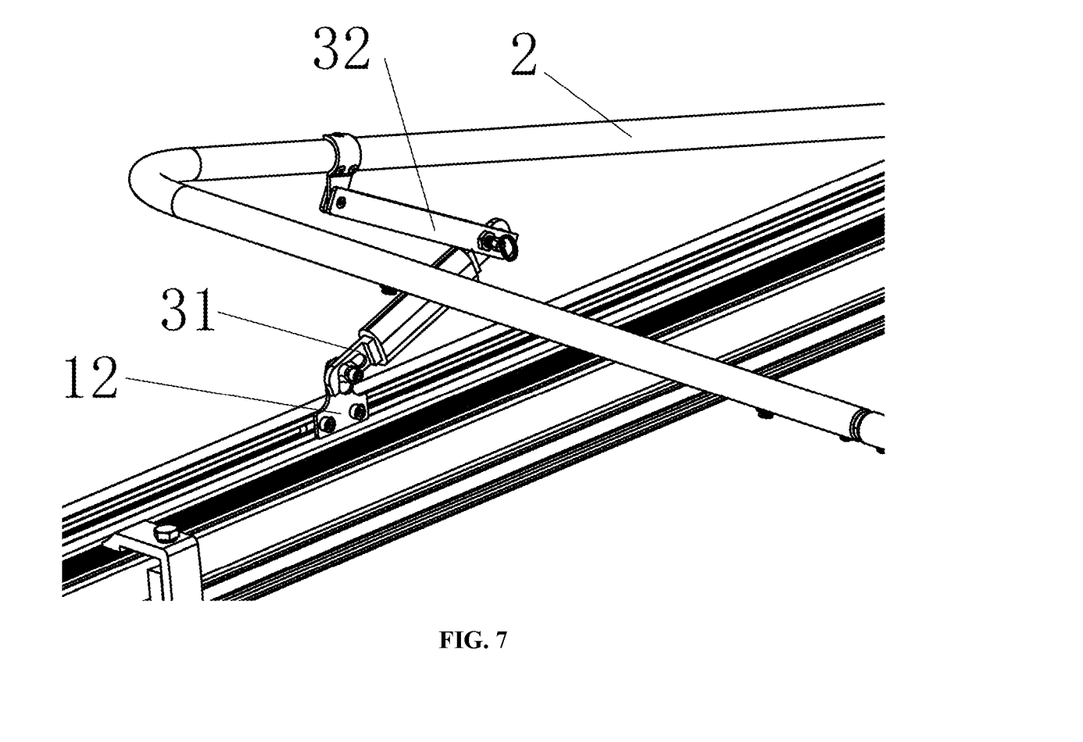
FIG. 7 is a folded state view of the folding support rod.

The folding support rod 3 includes a first support rod 31 and a second support rod 32. The first support rod 31 is rotatably connected with the second support rod 32. A first limiting structure configured to limit the first support rod and the second support rod in an unfolded state is arranged between the first support rod 31 and the second support rod 32.

The first limiting structure includes a pull-ring indexing pin 4. A shell 41 of the pull-ring indexing pin 4 is fixedly connected with the second support rod 32. The first support rod 31 is provided with a limiting hole used for penetration of a pin shaft 42 of the pull-ring indexing pin 4.

A screw 5 is arranged between the first support rod 31 and the second support rod 32. The first support rod 31 is provided with a threaded hole matched with the screw 5. The second support rod 32 is provided with a through hole. The through hole has a diameter greater than or equal to an outer diameter of a stud of the screw 5. The screw 5 passes through the through hole and is in threaded connection with the threaded hole.

A second limiting structure configured to limit relative rotation directions of the first support rod and the second support rod is further arranged between the first support rod 31 and the second support rod 32.

The second limiting structure includes a step 311 arranged on the first support rod 31. An end of the second support rod 32 is in surface contact with the step 311. The end of the second support rod 32 includes one side being a right angle and the other side being a round chamfer 321.

Figure 4:
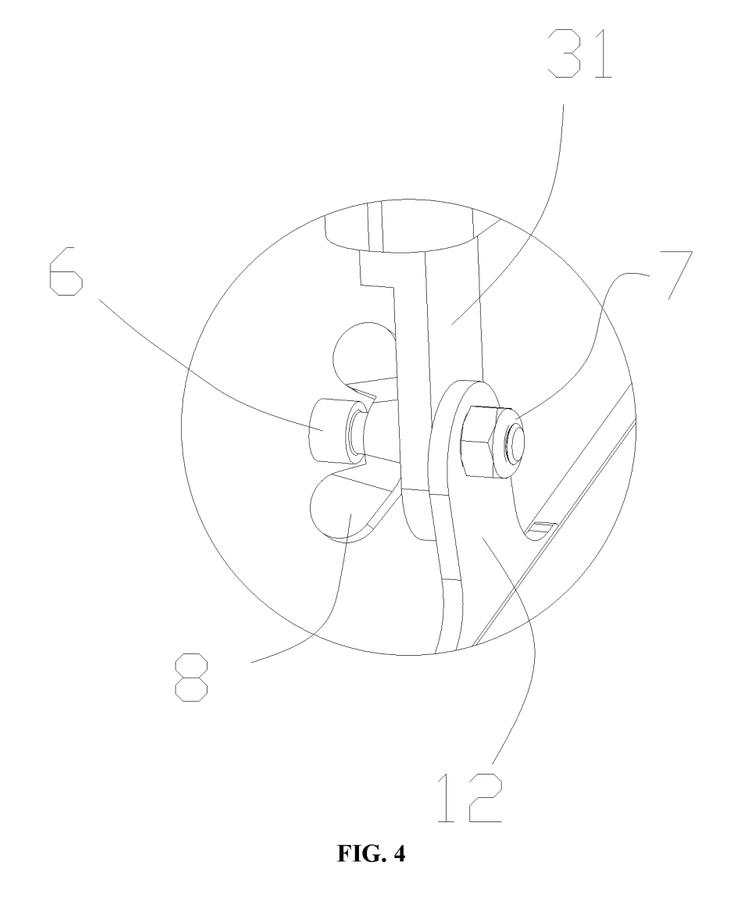
FIG. 4 is a partial enlarged view of a position B in FIG. 3.

The folding support rod 3 and the second base 12 are connected by a quick release method, and a specific structure is as follows: the folding support rod 3 and the second base 12 are each provided with a through hole. The two through holes correspond to each other in position, and a bolt 6 penetrates the through holes. A head of the bolt 6 is matched with a nut 7. An end of the folding support rod 3 is provided with a clamping groove. The clamping groove is clamped on the bolt 6, and the bolt 6 is matched with a butterfly nut 8 configured to press and fix the folding support rod 3 and the second base 12.

The pull-ring indexing pin 4 is provided with a spring against the pin shaft 42. When the pin shaft 42 is pulled out from the limiting hole of the first support rod 31, the first support rod 31 and the second support rod 32 can rotate relative to each other.

Figure 1:
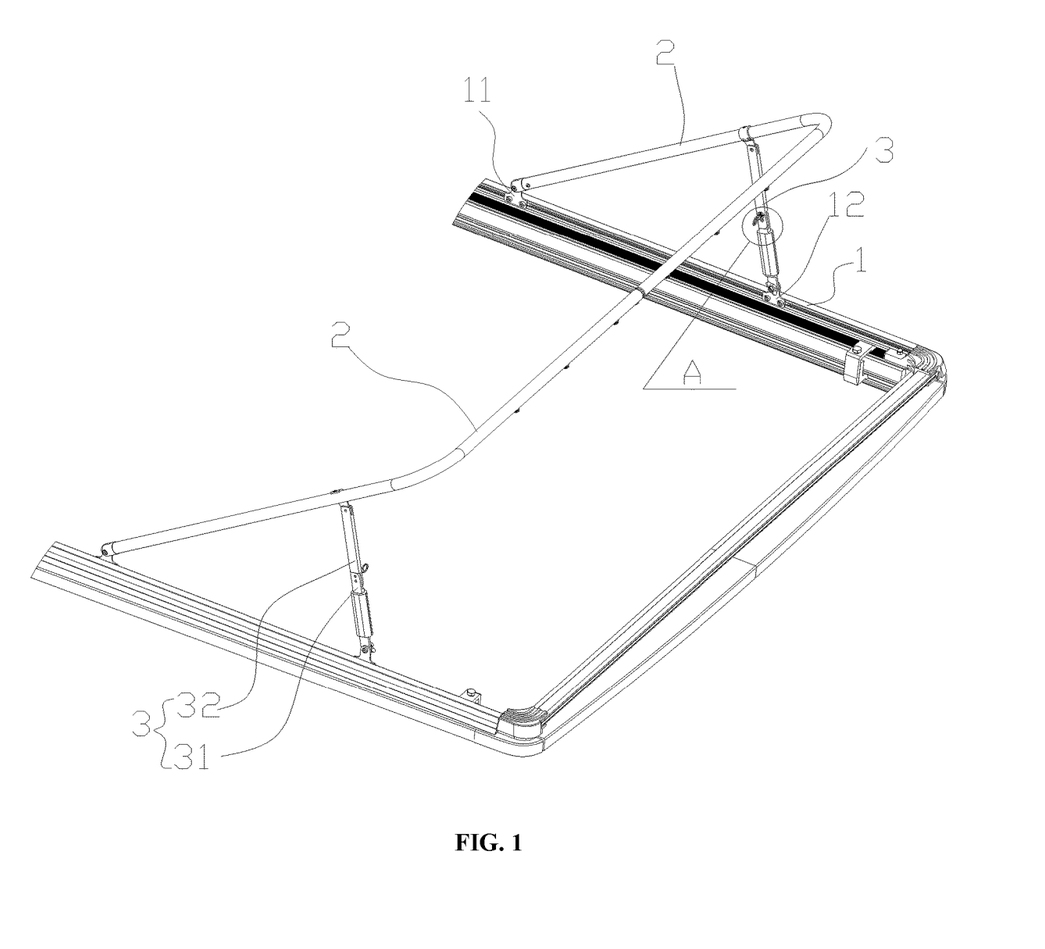
FIG. 1 is a first three-dimensional diagram of a foldable support structure for a soft high top of a pickup truck of the present invention.
Figure 2:
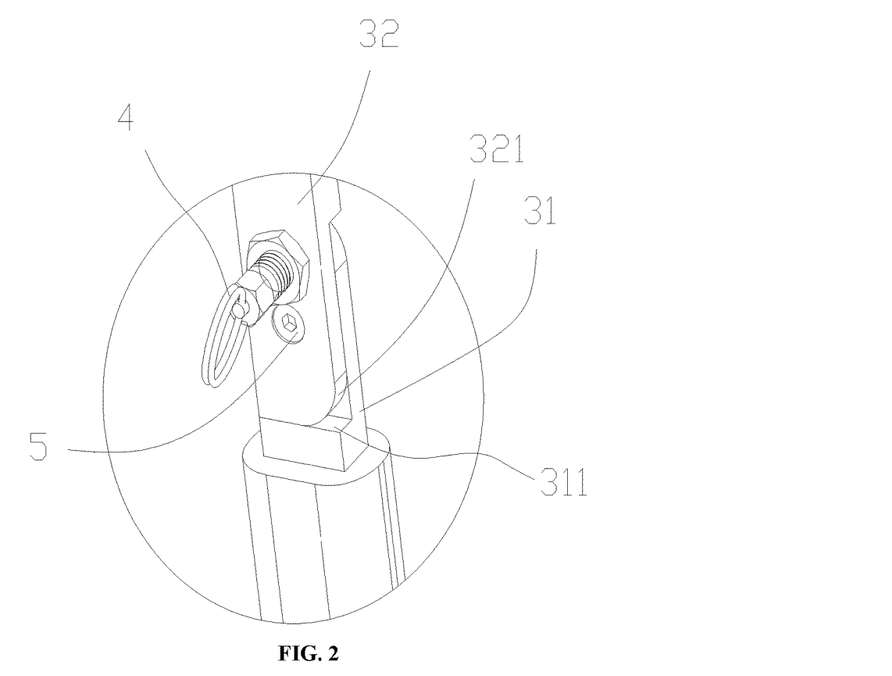
FIG. 2 is a partial enlarged view of a position A in FIG. 1.
Figure 3:
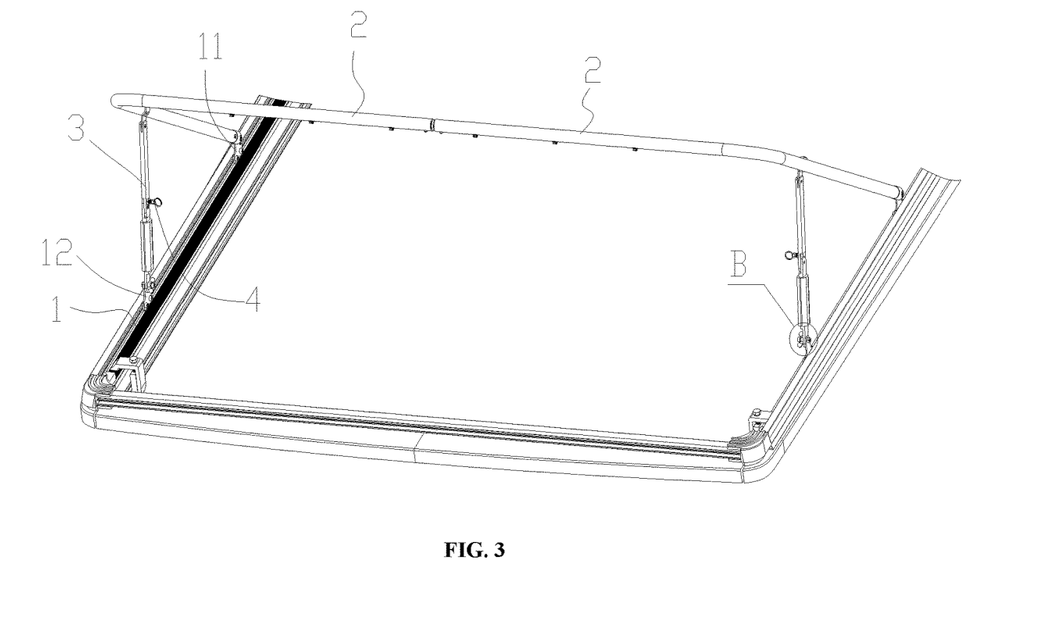
FIG. 3 is a second three-dimensional diagram of the foldable support structure for a soft high top of a pickup truck of the present invention.

The installation base frame 1 is symmetrically arranged on both sides of the vehicle body. The support frames 2 are symmetrically distributed. The support frames 2 on both sides are connected by a connecting piece. Each support frame 2 is correspondingly provided with a folding support rod 3.

The foldable support structure of the present invention can be matched with the support frame fixed on the vehicle frame to form an integral support frame of the soft top. Then the soft top covers the integral support frame, and the soft top is fixed with the vehicle frame or other positions. The novel support structure of the present invention can be arranged at the rear of the vehicle to facilitate adjustment.

The above merely describes specific implementations of the present invention, but the protection scope of the present invention is not limited thereto. Those skilled in the art can easily conceive modifications or replacements according to the technical solutions and ideas of the present invention within the technical scope of the present invention, and these modifications or replacements shall fall within the protection scope of the present invention.

What is claimed is:

1. A foldable support structure for a soft high top of a pickup truck, comprising:
    an installation base frame, wherein the installation base frame is fixedly connected with or integrally formed with a vehicle body;
    a support frame, wherein the support frame is hinged with the installation base frame; and
    a folding support rod, wherein the folding support rod comprises a first end hinged with the support frame, and a second end connected with the installation base frame;
    wherein the folding support rod comprises a first support rod and a second support rod, the first support rod is rotatably connected with the second support rod, and a first limiting structure configured to limit the first support rod and the second support rod in an unfolded state is arranged between the first support rod and the second support rod; and
    wherein the first limiting structure comprises a pull-ring indexing pin, a shell of the pull-ring indexing pin is fixedly connected with the second support rod, and the first support rod is provided with a limiting hole configured for penetration of a pin shaft of the pull-ring indexing pin.

2. The foldable support structure according to claim 1, wherein a first base and a second base are arranged on the installation base frame, positions of the first base and the second base on the installation base frame are adjustable, the support frame is hinged on the first base, and the folding support rod is detachably fixed on the second base.

3. The foldable support structure according to claim 1, wherein a screw is arranged between the first support rod and the second support rod, the first support rod is provided with a threaded hole matched with the screw, the second support rod is provided with a through hole, the through hole has a diameter greater than or equal to an outer diameter of a stud of the screw, and the screw passes through the through hole and is screwed into the threaded hole.

4. A foldable support structure for a soft high top of a pickup truck, comprising:
    an installation base frame, wherein the installation base frame is fixedly connected with or integrally formed with a vehicle body;
    a support frame, wherein the support frame is hinged with the installation base frame; and
    a folding support rod, wherein the folding support rod comprises a first end hinged with the support frame, and a second end connected with the installation base frame;
    wherein the folding support rod comprises a first support rod and a second support rod, the first support rod is rotatably connected with the second support rod, and a first limiting structure configured to limit the first support rod and the second support rod in an unfolded state is arranged between the first support rod and the second support rod; and
    wherein a second limiting structure configured to limit relative rotation of the first support rod and the second support rod is further arranged between the first support rod and the second support rod.

5. The foldable support structure according to claim 4, wherein the second limiting structure comprises a step arranged on the first support rod, an end of the second support rod is in surface contact with the step, and the end of the second support rod comprises one side being a right angle and the other side being a round chamfer.

6. The foldable support structure according to claim 2, wherein the folding support rod is provided with a first through hole, the second base is provided with a second through hole, a position of the first through hole corresponds to a position of the second through hole, a bolt penetrates the first through hole and the second through hole, a head of the bolt is matched with a nut, an end of the folding support rod is provided with a clamping groove, the clamping groove is clamped on the bolt, and the bolt is matched with a butterfly nut configured to press and fix the folding support rod and the second base.

* * * * *